J. B. EADS.
Iron-Bridge.

No. 162,357.

5 Sheets--Sheet 1.

Patented April 20, 1875.

ATTEST:
Robert Burns.
Henry Tanner.

INVENTOR:
James B. Eads
By Knight & Bro.
Attys.

THE GRAPHIC CO. PHOTO-LITH. 39 & 41 PARK PLACE, N.Y.

J. B. EADS.
Iron-Bridge.

No. 162,357.

5 Sheets--Sheet 2.

Patented April 20, 1875.

ATTEST:
Robert Burns.
Henry Tanner

INVENTOR:
James B. Eads

THE GRAPHIC CO.PHOTO-LITH.39 & 41 PARK PLACE, N.Y.

J. B. EADS.
Iron-Bridge.

No. 162,357.

5 Sheets--Sheet 4.

Patented April 20, 1875.

ATTEST:
Robert Burns
Henry Tanner

INVENTOR:
James B. Eads
By Knight Bro's
Atty's

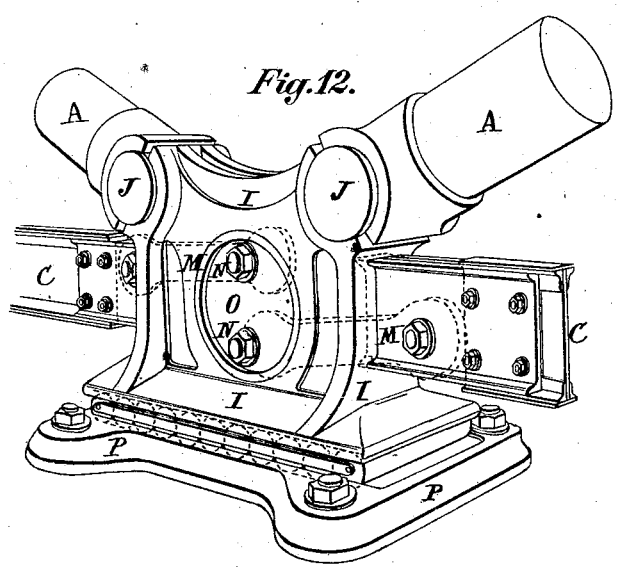

UNITED STATES PATENT OFFICE.

JAMES B. EADS, OF ST. LOUIS, MISSOURI.

IMPROVEMENT IN IRON BRIDGES.

Specification forming part of Letters Patent No. 162,357, dated April 20, 1875; application filed August 1, 1874.

*To all whom it may concern:*

Be it known that I, JAMES B. EADS, of St. Louis, in the county of St. Louis and State of Missouri, have invented certain new and useful Improvements in Bridges, of which the following is a specification:

My invention relates to certain modifications in the manner of attaching the chords of metallic bow-string girders to the ends of the arches of said girders, whereby the effects of expansion and contraction in said chords are compensated without movement of the ends of the arches, and the thrust of the arches is divided, in any desired proportion, between the said chords and fixed abutments. In proportion as the strains upon the chords are lessened their sectional areas may be smaller, and their weight consequently reduced. As a large portion of the weight of the chords must be carried by the arch, a reduction in the weight of the chords admits of a reduction in the section of the arches, also. This reduction of weight in the arches, in turn, lessens the thrust on the chords, and consequently results in an additional economy in the chords. As the piers and abutments which support girder-bridges frequently possess lateral strength, an economy may be gained by letting them receive a portion of the thrust of the arch of a bow-string girder, when it might not be economy to make them so strong as to receive the entire thrust, as in the case of arched bridges.

Figure 1:
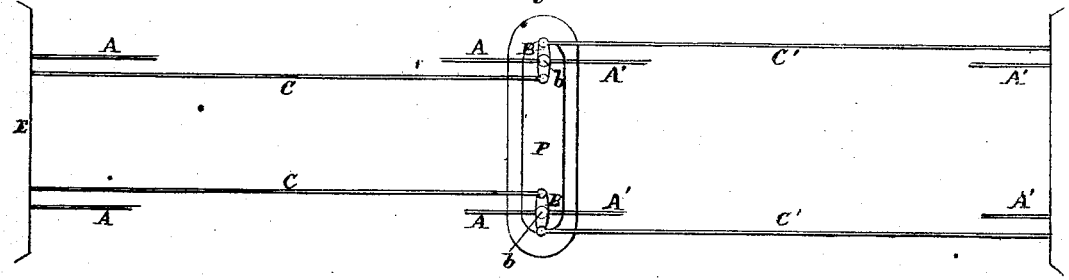
Figure 2:
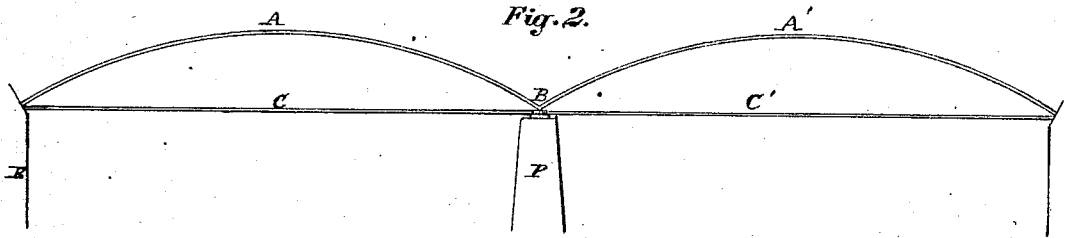

Under one form of my invention, (illustrated by the diagrams, Figures 1 and 2,) I unite the adjacent ends of the chords C C of two arches, A A$^1$, to the opposite ends of a lever, B, from the center or fulcrum $b$ of which the said arches spring, the effect being to permit the free expansion and contraction of the chords, without changing the position of the fulcrum of the lever or cross-beam B, from which the arches spring, the simultaneous movement of the adjacent ends of the two chords acting simply to deflect the said lever. The lever may be placed so as to move vertically or horizontally.

It will also be seen that the tensile strain produced on either chord C by the loading of one arch of the bridge in excess of the other will be communicated through the lever B as a thrust on the chord of the adjoining arch, thus relieving the pier P of the horizontal strain. In this case the abutments are not relieved of any excess of thrust when both arches are loaded, for the arches balance each other with their loads, and no strain whatever will be on the chords.

If we assume that the thrust of an unloaded arch equals one hundred tons and the thrust from its maximum load another one hundred tons, then, if this two hundred tons were held by the chord in the usual manner of bow-string girders, it would have to be of four times its present section, for the arches balance each other when both are unloaded or both loaded; but when only one is loaded the chords sustain but half the thrust from it, for the entire thrust from the load is received against the fulcrum or middle of the levers, and consequently but one-half comes on the chords of the loaded arch; and this is in tension, while the other half is thrown by the other end of the lever against the chords of the unloaded arch, and is a compressive strain on them. Hence the economy shown in this arrangement over the ordinary bow-string girder is in saving three-fourths ($\frac{3}{4}$) of the weight of the chords, and consequent reduction in the weight of the arch, from being relieved of so much dead load.

While the economy over the ordinary arch-bridge is in the reduction of cost of the center pier, which in this case bears no thrust, the skew-back on the top of the center pier, to which the fulcrums of the levers are pivoted, should be permitted to slide, unless the pier be allowed to receive a small portion of the thrust, for when one set of chords are stretched and the other compressed, the result will be a slight horizontal movement of the central skew-back, which will be proportionate to the length of the spans.

Figure 3:
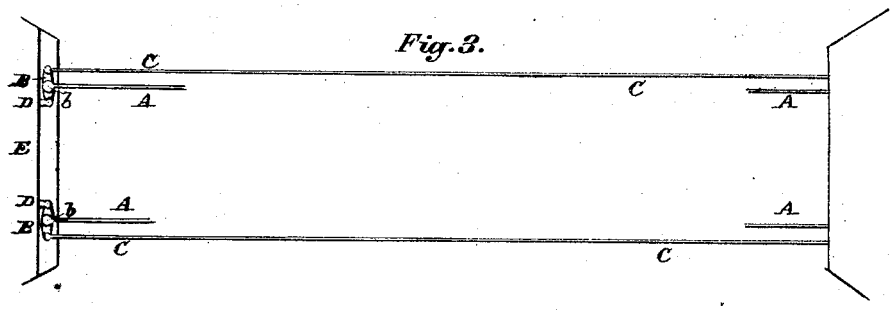
Figure 4:
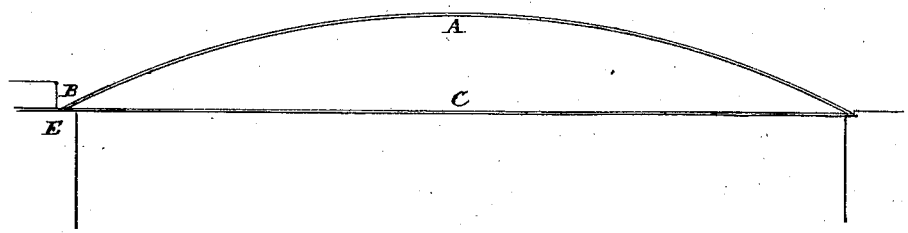

Figs. 3 and 4 are, respectively, a plan and an elevation, illustrating the application of a similar principle to a single arch or bow-string girder, for the purpose of dividing the strain of the thrust of the said arch between the chords and the abutment thereof, in any proportions that may be required. In this case the thrust of the arch A is received against the fulcrum of the lever B, which is located at a point between its ends, the said lever being pivoted at one end to the strut D or abutment, and at the other to the chord C. This lever arrangement is only needed at one end of the arch.

It will be manifest that if the fulcrum of the lever be midway between the ends of the lever, one-half of the thrust will be sustained by the abutment E, through the medium of the strut D, and the other half by the chord C, and it will further appear that by locating the seat of the arch nearer to one or the other end of the said lever, the respective loads sustained by the chord and the abutment may be proportioned as desired. In this case it is evident that the abutment for a single arch may be reduced to half the strength required for an arch without the bow-string.

Figure 5:
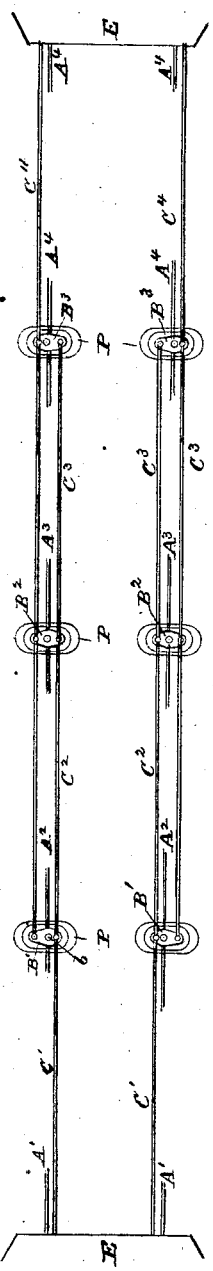
Figure 6:
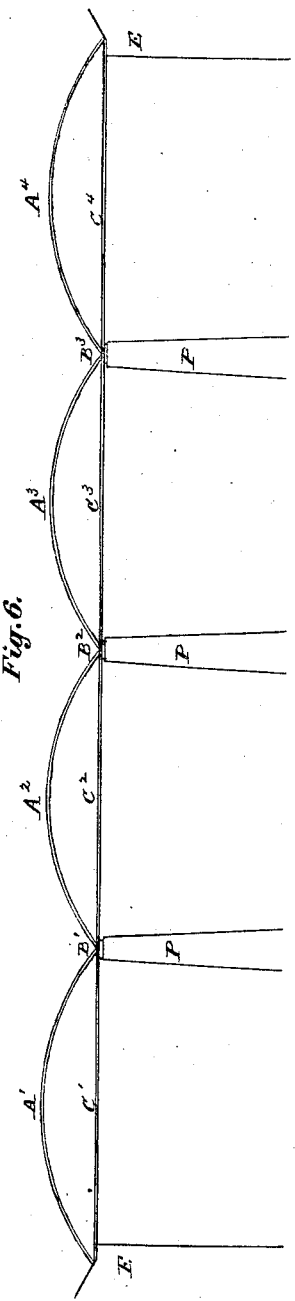

Figs. 5 and 6 are, respectively, a plan and an elevation, illustrating the application of the same principle to a bridge of more than two spans, so as to distribute the strain of one or more loaded arches between the chords of all the arches, and between the chords and the abutments.

By the construction shown the intermediate piers P P P are relieved of any strain from the thrust of the arches. The thrust of the arches, as before, is received against an intermediate fulcrum of each of the levers B, to the ends of which the chords $C^1$ $C^2$, &c., are attached, and the relative distances between the fulcrum and the ends of the lever graduate the proportionate tension and thrust sustained by the respective chords, as may be required. Supposing a load to be placed on the arch $A^3$, as the said arch thrusts against the levers $B^2$ and $B^3$ these levers will communicate strains to each of the chords attached to these levers in proportion to the relative lengths of the arms of the levers. The chords under the loaded arch will be strained in tension, while a portion of the thrust will be transmitted in compression to the abutment E by the chords $C^4$, and to the other abutment it will be transmitted by compression through the chords $C^2$ and $C^1$. The lengths of the lever-arms in this arrangement should be proportioned according to the distance from the abutments at which they are attached to the respective chords, so that the expansion and contraction from temperature may be so compensated that the fulcrums of the levers will not be disturbed thereby. It will be seen that the chords starting at each abutment are continuous over three of the four spans, and that the movement of any point on either chord will be increased (by temperature) according to its distance from the abutment where one of its ends is fastened and immovable. Consequently, in proportion to the distance from the abutment at which the point is located for the lever attachment, that end of the lever should be lengthened.

If the load be on A, then the chords $C^1$ receive three-fourths of the thrust in tension, and the other one-fourth is thrown by the long end of the lever B against the chord which abuts against the farther abutment.

As metal bridges are usually composed of two or more ribs or trusses, it will be understood that it will generally be necessary to have one chord with its lever for each rib.

It will be found that for all vertical strains the levers on opposite sides of the span are deflected in the same direction, but that a lateral strain, as from wind-pressure, will cause one chord of the span to be stretched and the other compressed, and therefore the levers will receive an impulse to deflect them in opposite directions. In a series of spans economy will generally be secured with this system, in bracing against the wind, by the continuous-girder principle; but, as thus far described, this tendency of the levers to deflect in opposite directions from lateral pressure destroys that effect of continuity of the chords over each pier, which is requisite in the continuous-girder principle, and which would be present in this if the levers on both sides acted together, as in case of temperature. To compel them to so act, Fig. 7 shows a plan by which the levers on one side of the pier are so connected to those on the other that under all circumstances the ends of the levers attached to the chords of each span will be deflected together, and hence will resist the forces which tend to deflect them contrariwise.

Figure 7:
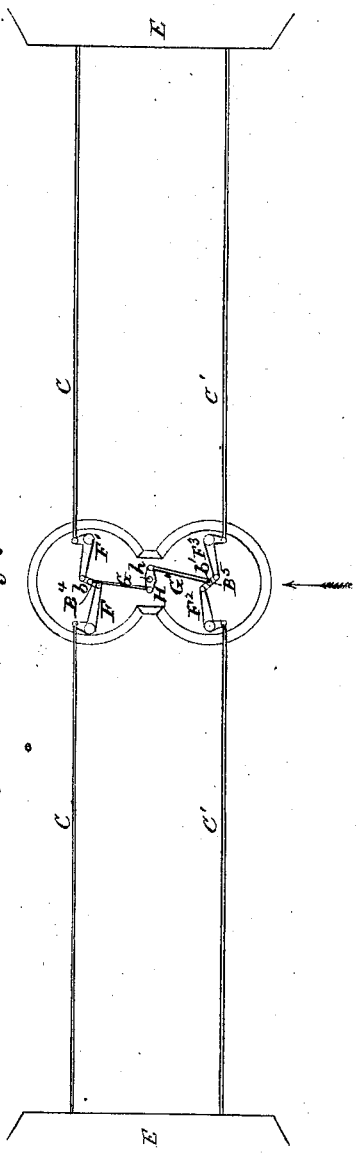

In Fig. 7 the bell-crank levers F $F^1$ $F^2$ $F^3$ have their fulcrums secured to the pier or skew-backs, and to the outer ends of the chords C C $C^1$ $C^1$.

The inner ends of each pair of levers F $F^1$ or $F^2$ $F^3$ are connected by bars $B^4$ $B^5$. Rods G $G'$ connect the centers $b$ $b'$ of the bars $B^4$ $B^5$ with the respective ends of the lever H, pivoted at $h$.

It will now appear that any horizontal pressure (as from wind) in the direction of the arrow, imparting a tensional strain to the chords C C, and tending to draw apart the ends of the levers F $F^1$, to which they are attached, will be transmitted through the said levers and the rod G, lever H, and rod $G'$, and levers $F^2$ $F^3$, to the other chords $C^1$ $C^1$ in a compressive strain, so that the structure constitutes an effective horizontal truss, and at the same time it permits the free expansion and contraction of the metal without any violence, and without changing the position of the pier or arch-supports, for it will be seen by tracing the connections that an elongation of all the chords C C $C^1$ $C^1$, under an increase of temperature, will simply turn the levers F $F^1$, &c., on their centers, and, by a thrust on the rods G $G'$, deflect the central lever H. Contraction in cooling acts in the reverse direction with the same freedom, and still without disturbing the arch-supports.

It will further appear that when one arch is loaded more than another the thrust from it will be borne equally by the chords of that particular arch and those of the adjoining arch—the loaded chords by tension, and the unloaded ones by compression. This arrangement admits of several modifications of the levers and their connections.

A modification of the levers described, by which the whole system is greatly simplified and strengthened, will be seen in Figs. 8, 9, 10, 11, and 12. The levers are modified into disks O O, as seen in these Figs. 8, 9, 10, 11, and 12.

Figure 8:
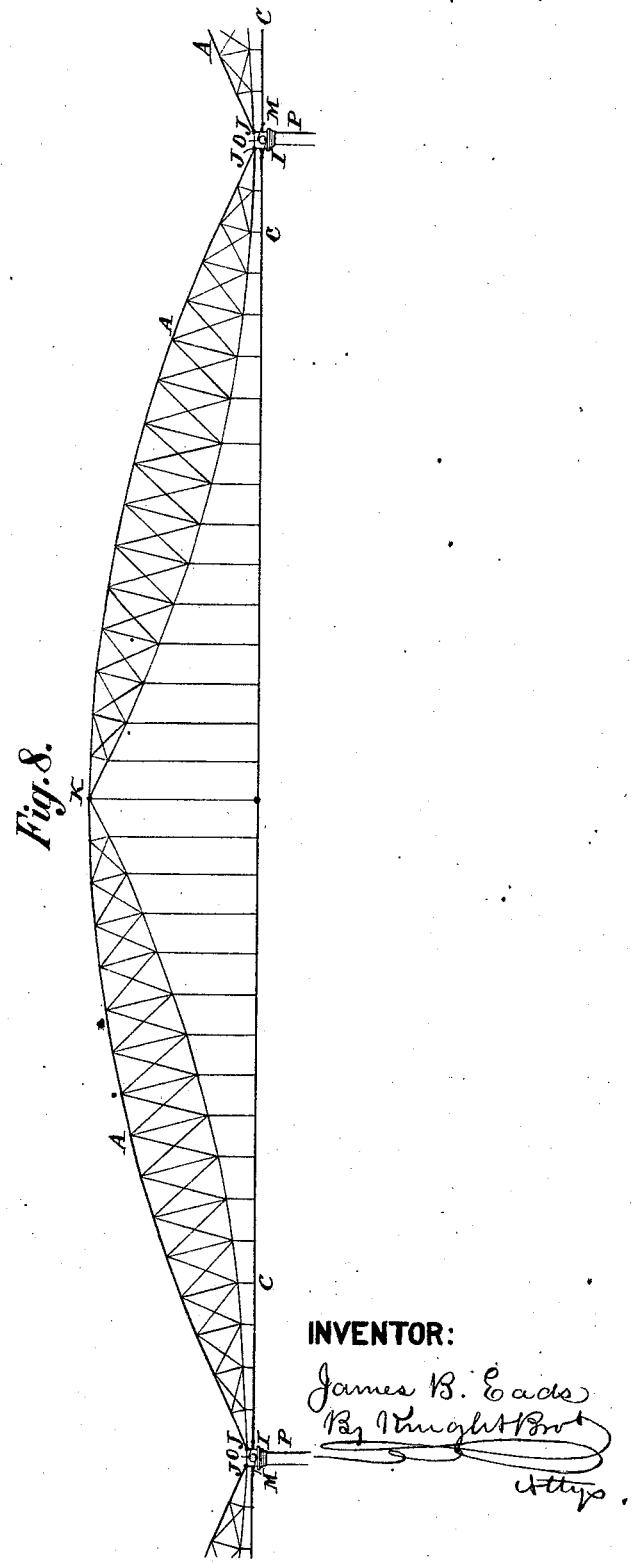
Figure 9:
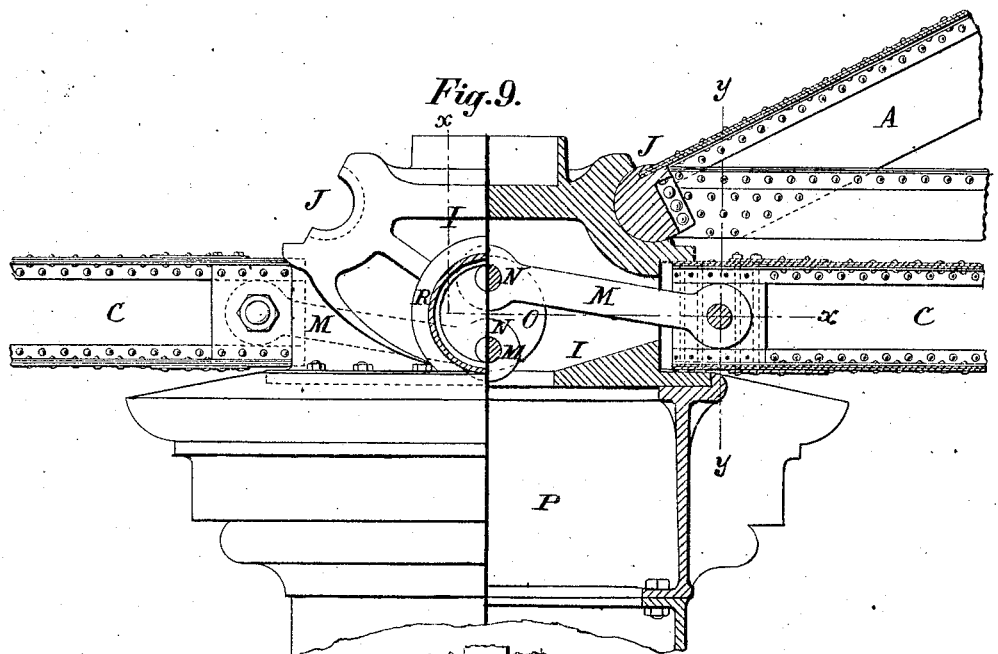
Figure 10:
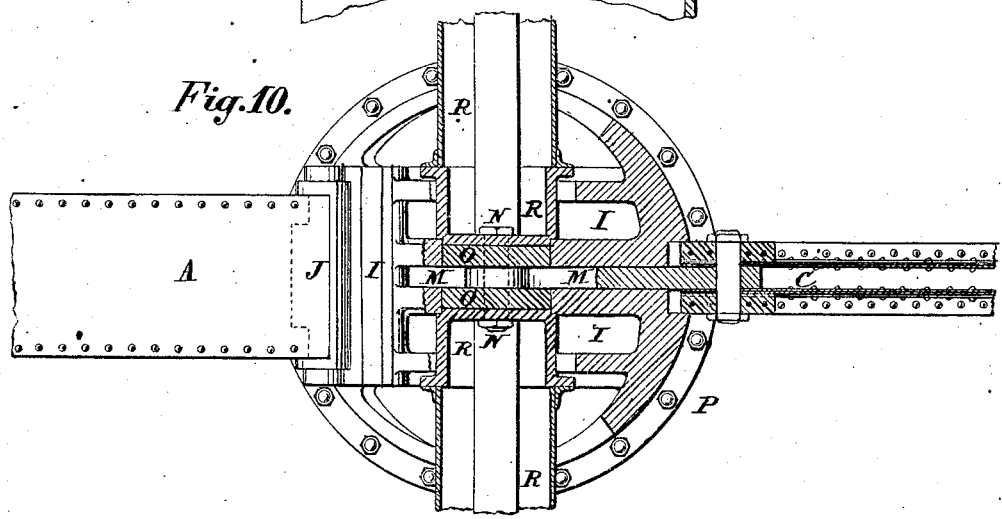
Figure 11:
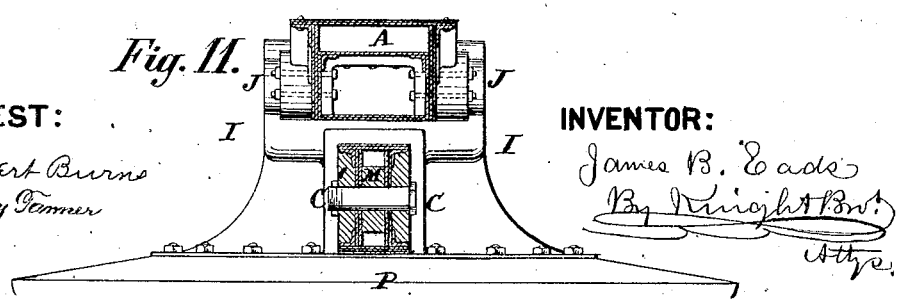

Fig. 8 is a bow-string girder, with the disks shown in the skew-backs, which latter may slide on the pier-head, or may constitute an immovable part of the pier-head. Fig. 9 shows a pier-head with the ends of the chord and arch, one-half in side elevation and the other half in longitudinal section. Fig. 10 is a view of a pier-head, looking down, showing a portion in horizontal section at the line $x\,x$ in Fig. 9. Fig. 11 is an end view of the pier-head, showing the arch and girder in transverse section at the line $y\,y$, Fig. 9. Fig. 12 is a perspective view, with rollers between the skew-back and pier-head.

The chords C are connected by links M M (or pivoted connecting-bars) to the disks O O, the latter turning freely in sockets in the skew-back I, one of the links M being pivoted to the disks above their centers, and the other link M being pivoted to the disks below the centers—two disks being used together, between which the links M M are inserted. By this construction the expansion or contraction of all the chords by temperature merely causes a proportional rotation of the disks.

In using but one arch one of the links would act as a strut to throw the thrust of the arch against one abutment, while the other would constitute part of the chord, the other end of which would be secured to the skew-back at the opposite abutment, which latter skew-back need not be movable. The one, however, arranged with the disks would, in a single arch, be movable, as the pin of the strut-link, passing through the disks, would in that case become a fixed point, so far as longitudinal movement is concerned; whereas, if two arches be used of equal length, it is evident that, as the expansion and contraction of the chords of each would be practically the same, no movement of the skew-back between the two would take place. In one pair of arches, but one set of disks would be requisite, for a chord from each span and all the disks would be located in the central skew-back. This method is more particularly applicable for single arches, or where they are arranged in pairs, than where several constitute a series.

It will be seen that to resist wind-pressure, or the opposite movement of the disks under lateral forces, it is only necessary to connect the disks on opposite sides of the bridge together by means of a tube of sufficient torsional strength to resist the twisting strain induced by wind-pressure, and thus practically make each chord of two spans continuous over the central pier, and thus secure the economy of a continuous wind-truss, of which the chords would be the same as those holding the thrust of the arches. This is readily understood by reference to Fig. 10, where two such tubes are shown, marked R R. Fig. 10 shows the disks O O arranged for the central chord of a span having three ribs or arches. The tubes are shown as bolted by the link-pins N to the disks O O, from which they extend outwardly to the disks of the outside chords. The ends of the tubes are shown thicker (as of cast metal) than the central parts. The arches of this system should be jointed at J to the skew-backs, and, if braced with inverted or counter arches, as in Fig. 8, should have a central joint, K, at the crown, and a joint in the chords beneath the central joint, as the arch must rise and fall at the crown from the effects of heat and cold, it being prevented from moving at the abutments as ordinary bow-string girders do.

Figs. 1, 2, 3, 4, 5, 6, and 7 are intended to illustrate more particularly the theory of these improvements, and not the practical details. These will be fully comprehended by reference to Figs. 8, 9, 10, 11, and 12, with the explanations of the text.

I claim—

1. In combination with the tension members C of bow-string or similar girders, the disks O O or levers B B, fulcrumed in or to the skew-back or arch-rest, as set forth, for the purpose of compensating for the effects of temperature, and for distributing the strains from load and wind pressures, as described.

2. The combination of skew-back or arch-rest I, disks O O, and links or connecting-bars M M, all constructed substantially as and for the purpose set forth.

3. In combination with the disks O O, the connecting shaft or tube R, extending transversely to the bridge, and connecting the disks together upon the opposite sides of the span, to prevent said disks turning in opposite directions, for the purpose set forth.

JAMES B. EADS.

Witnesses:
SAML. KNIGHT,
GEO. C. FABIAN.